United States Patent Office 3,766,129
Patented Oct. 16, 1973

3,766,129
PRE-IMPREGNATED MATERIALS
Gaston Pesez, Chauny, France, assignor to Regie Nationale des Usines Renault, Billancourt, and Produits Chimiques Pechiney-Saint-Gobain, Neuilly-sur-Seine, France, fractional part interest to each
No Drawing. Filed July 9, 1971, Ser. No. 161,346
Claims priority, application France, July 9, 1970, 7025468
Int. Cl. C08g 51/04
U.S. Cl. 260—40 R
17 Claims

ABSTRACT OF THE DISCLOSURE

Pre-impregnated materials of reinforcing fibers impregnated with a composition formed of a copolymerizable polyester resin formed of 50–98% by weight of a copolymerizable polyester resin and 50–2% by weight of a solution of an oligoester having terminal maleic acid groups and containing a polymerization initiator in an amount within the range of 0.5–2% by weight and an oxide or hydroxide of a metal of Group II of the periodic classification of elements in an amount within the range of 1–10% by weight.

---

This invention relates to pre-impregnated materials in the form of reinforcing fibers in which the pre-impregnated materials are easy to handle and preserve and it relates further to an impregnating composition of copolymerizable polyester resins and to the method for obtaining said pre-impregnated materials.

As used herein, the term "copolymerizable polyester resins" is meant to include a mixture of at least one polycondensate and at least one cross-linking vinyl monomer containing at least one polymerization inhibitor.

The pre-impregnated materials, such as pre-impregnated fibers, are well known but their handling and preservation before molding have a number of disadvantages which can be remedied by causing a thickening of the impregnating composition after impregnation of the reinforcing fibers.

For this purpose, it has previously been proposed, before impregnation of the reinforcing fibers, to add to the composition one or more metallic oxides or hydroxides, preferably magnesium oxide. These metallic oxides or hydroxides operate markedly to increase the viscosity of the impregnating composition, but the required time (ripening duration) for the pre-impregnated materials to reach the appropriate consistency which enables them to remain homogeneous and easy to handle is within the range of from one to two weeks, which is a relatively long time.

In order to reduce the time for ripening of the impregnating composition with the metallic oxide or hydroxide mixture, various additives have been proposed. In some cases, the increase in viscosity is so rapid as to make it difficult properly to impregnate the reinforcing fibers, whereas, in other cases, the increase in viscosity is such that it does not permit the extended preservation of the pre-impregnated material before molding and copolymerization, in that the product becomes too rigid and difficult to mold.

Under the best conditions, the ripening duration is still several hours, making it necessary to handle and to store non-rigid and distortionable pre-impregnated materials. This is detrimental to the homogeneity of the pre-impregnated materials and the reproductibility of the properties of the molded and copolymerized products.

It is an object of this invention to obviate these disadvantages and to achieve ripening within the desired period of time, by way of a simple and brief act; to permit production of pre-impregnated materials having a homogeneous composition with sufficient consistency to permit easy handling and preservation and to yield molded and polymerized articles having uniform and consistent properties.

The pre-impregnated materials of this invention are composed of (a) from 10–70% by weight of reinforcing fibers and (b) from 90–30% by weight of an impregnating composition composed of from 50–98% by weight of a copolymerizable polyester resin and from 50–2% by weight of a solution of at least one oligoester having terminal maleic acid groups and containing from 0.5–2% by weight, based upon the resin-oligoester solution mixture, of at least one polymerization initiator, and from 1–10% and preferably 2–5% by weight, based on the resin-oligoester solution mixture, of one or more oxides or hydroxides of metals of Group II of the periodic classification of elements.

Representative of the reinforcing fibers which may be used are natural fibers, such as flax, asbestos, sisal, hemp, jute, cotton, and artificial fibers, such as nylon, glass, carbon, graphite and paper. Such fibers, which may be used alone or in admixture, may be in the form of monofilaments, threads, mats or fabrics.

The polycondensate of the copolymerizable polyester resin, such as heretofore defined, is composed of a conventional product for the preparation of polyester resins, such as is usually obtained by reacting at least one polyol with one or more polycarboxylic cids or anhydrides, $\alpha,\beta$-unsaturated, and eventually one or more saturated polycarboxylic acids or anhydrides.

Representative of the polyols which can be used are ethylene glycol, propylene glycol, diethylene glycol, triethylene glycol, tetraethylene glycol, neopentyl glycol, butylene glycol, dipropylene glycol, glycerol, trimethylolpropane, pentaerythritol, trimethylpentanediol, trimethylpropanediol, 1,6 - hexamethylenediol, hydrogenated bisphenol A and its derivatives.

The $\alpha,\beta$-unsaturated polycarboxylic acids and anhydrides are represented by maleic acid and hydride, itaconic acid and anhydride, fumaric acid and mesaconic acids.

Representative of the saturated polycarboxylic acids and anhydrides which can be used are succinic, methylsuccinic, adipic, sebacic, orthophthalic, tetrahydrophthalic, hexahydrophthalic, tetrachlorophthalic, tetrabromophthalic, hexachloroendomethylene - tetrahydrophthalic, trimellic acids and anhydrides and isophthalic acid.

Use may be made of cross-linking vinyl monomers such as styrene, $\alpha$ - methylstyrene, chlorinated derivatives of styrene, vinyltoluene, divinylbenzene, allyl phthalate, triallyl cyanurate, acrylates and methacrylates of lower alkyls in which the number of carbon atoms does not exceed 6, butanediol-1,3 dimethacrylate, vinyl acetate, propionate and pivalate.

In the preparation of copolymerized polyester resins, the cross-linking vinyl monomer is employed in the usual proportions, such as 20–50% by weight per 80–50% by weight of polycondensate.

In order to insure the preservation of the solution before copolymerization, addition is made of one or more polymerization inhibitors selected from the conventional inhibitors such as hydroquinone, paratertiobutylcatechol, monomethylic ether or monoethylic ether of hydroquinone, benzoquinone, tertiobutyl - 2,5 - hydroquinone, and a substituted or unsubstituted phenol or polyphenol.

These inhibitors are added in amounts within the range of 20 to 550 p.p.m. by weight of the copolymerizable polyester resin.

The solution of oligoester having terminal maleic acid groups is composed of a mixture of at least one oligoester having terminal maleic acid groups and at least one cross-linking vinyl monomer containing at least one polymerization inhibitor.

Such solutions of oligoesters are more specifically defined in copending application Ser. No. 84,194, filed Oct. 26, 1970, entitled "Copolymers of Oligoesters Having Maleic Acid End Groups and Vinyl Monomers." The oligoesters having terminal maleic acid groups are formed by reaction of maleic anhydride with one or more polyhydroxylated compounds in the ratio of one mole maleic anhydride per hydroxyl group. The polyhydroxylated compounds used contain at least two hydroxy groups and may be selected from the saturated or unsaturated aliphatic, cycloaliphatic, or aromatic alcohols. They can be substituted by alkyl or alkoxy groups and/or halogen atoms and they can also contain one or more ester and/ or ether and/or amide and/or urethane functions.

The oligoesters are represented more particularly by the acid maleate of 2,2,4-trimethyl-pentane-1,3-diol; acid maleate of neopentyl glycol; acid maleate of trimethylolpropane, and acid maleate of glycerol.

The cross-linking vinylic monomer selected from the list of cross-linking vinyl monomers previously described represents about 15-75% by weight of the oligoester solution.

Preferably, the cross-linking vinylic monomer in which the oligoester having terminal maleic acid groups is dissolved is the same as that used in the composition of the copolymerizable polyester resin.

The solution of the oligoester having terminal maleic acid groups contains from 20 to 500 p.p.m. by weight of one or more polymerization inhibitors selected from the materials previously described and similar to those used in the copolymerizable polyester resin or different therefrom.

The copolymerization of the mixture of polyester resin and oligoester solution, at the time of molding the preimpregnated material, is obtained by addition of 0.5-2% by weight, based on the mixture, of a polymerization initiator, selected of the conventional organic peroxides or hydroperoxides such as benzoyl peroxide, dicumyl peroxide, tertiary butyl perbenzoate, tertiary butyl hydroperoxide, cumene hydroperoxide, and the like.

The oxides or hydroxides of metals of Group II of the periodic classification of elements are preferably selected of calcium, magnesium or zinc oxides or hydroxides.

Independently of the essential constituents described, the impregnating composition of this invention may optionally contain lubricants, fillers, pigments, coloring agents and other known additives.

Lubricants, such as calcium, zinc or magnesium stearates, may be employed in amounts within the range of 0.1-2% by weight, based upon the impregnating composition.

As the fillers, use can be made of materials generally employed in the preparation of pre-impregnated materials, such as calcium carbonate, clays, dolomites, talc, asbestos, silica, barium sulphate, aluminas, and the like. Such fillers can be employed in an amount within the range of 1-75% and preferably 40-60% by weight based upon the impregnating composition.

Agents modifying the aspect or the properties of the composition may also be added to the impregnating composition, such as, for example, homopolymers or copolymers of ethylene, propylene, styrene, methyl methacrylate and vinyl chloride. When present, use can be made in amounts within the range of 0.5-5% by weight of the impregnating composition.

In the preparation of pre-impregnated materials of this invention, an impregnating composition is formed by mixing 50-98% by weight of a copolymerizable polyester resin and from 50-2% by weight of a solution of at least one oligoester having terminal maleic acid groups to which from 0.5-2% by weight, based upon the resin-oligoester solution mixture, at least one polymerization initiator, from 1-10% and preferably 2-5% by wt., based on the resin-oligoester solution mixture of one or more oxides or hydroxides of metals of Group II of the periodic classification of elements and optionally lubricants, fillers, modifiers, pigments, and known additives, can be added in the amounts described. The reinforcing fibers are then impregnated with the formed composition in an amount within the range of 90-30% by weight of the composition for 10-70% by weight of reinforcing fibers. Thereafter, the material obtained is heated to a temperature within the range of 50-100° C. for a time within the range of 20 seconds to 15 minutes.

The mixture of the various components of the impregnating composition provides only a slight and slow increase in viscosity when maintained at room temperature. Consequently it is easy to achieve impregnation of the reinforcing fibers.

The impregnated product is then heated to a temperature within the range of 50-100° C. in order to increase the viscosity of the impregnating composition, that is to say, to ripen the impregnating composition. The ripening speed is dependent somewhat upon the nature and the amount of copolymerizable polyester resin and oligoester solution having terminal maleic acid groups, the metallic oxide or hydroxide content and the heating temperature. The temperature should always be below the copolymerization temperature of the resin-oligoester solution mixture.

It is possible to achieve ripening at a temperature below 50° C., but the ripening speed is noticeably reduced and this procedure therefore is of less interest.

The heat can be supplied by well known means, such as a hot air oven, heating plates, infra-red radiations, high frequency or ultra high frequency heating.

By reason of the simplicity of the various operations of the process, they may be easily combined into a continuous operation. For this purpose, the impregnating composition and the refinforcing fibers are simultaneously brought into an impregnation zone for mechanical combination such as by means of rolls, calenders, blanket with press rolls, and the like. The combined materials are then processed through a heating zone and through a cooling zone and after conditioning made ready for molding without the need to handle the materials from the time that they are combined until the product is formed.

The rapid increase in viscosity of the impregnating composition, being dependent on the heat supply, the preimpregnated materials can be handled and preserved at a temperature below or equal to about 20° C. for several months, such as three to six months, without substantial change in state and without evolution of its transformation abilities. This transformation is obtained by thermal forming or compression molding, as by well-known methods.

The material, pre-impregnated in accordance with the practice of this invention, may appear in the form of strips or masses to be molded or pressed, or in the form of yarns in reels or in clews, or in the form of rods or granules.

It will be understood that this invention has for its further object the application of such pre-impregnated materials in the manufacture of molded and polymerized articles, such as parts of car bodies, electrical boxes, insulators, filters, furniture and building materials.

The following examples are given my way of illustration, but not by way of limitation, of the practice of this invention.

EXAMPLE 1

A polycondensate is prepared from one mole of phthalic anhydride, two moles of maleic anhydride and three moles of 1,2-propylene glycol. This polycondensate is taken into solution in styrene at a concentration of 65% by weight of polycondensate based on the solution. 100 p.p.m. of hydroquinone are added to this solution.

The solution of polycondensate is separated in two fractions and two mixtures A and B are prepared, one containing an oligoester solution, whereas the other does not contain any such compound:

|  | Parts by weight | |
|---|---|---|
|  | Mixture A | Mixture B |
| Polycondensate solution | 50 | 45 |
| 65% oligoester solution of maleic anhydride and of 2,2,4-trimethyl-pentane 1,3-diol in styrene containing 100 hydroquinone | 0 | 5 |
| Dicumyl peroxide | 0.8 | 0.8 |
| Calcined magnesia | 1.5 | 1.5 |
| Calcium carbonate | 47.7 | 47.7 |

These mixtures are heated to 80° C. for 3 minutes, then cooled to a temperature of about 20° C.

The viscosity is determined at 23° C. by means of Severs' type viscosimeter respectively before heating, after heating to 80° C. and cooling to 20° C. and after 140 hours at 20° C.

The following results are obtained, expressed in poises:

|  | Mixture A | Mixture B |
|---|---|---|
| After mixture, before heating | 25.9 | 20.6 |
| After 3 minutes at 80° C. and cooling to about 20° C. | 2,000 | 14-10$^4$ |
| After 140 hours about 20° C. | 8-10$^6$ | 2-10$^6$ |

After heating it is observed that the viscosity of mixture B, with an oligoester solution has increased more than that of mixture A without an oligoester solution. On the other hand, the opposite occurs when the two mixtures are allowed to stand at a temperature close to 20° C.

EXAMPLE 2

The following mixture is prepared with the same polycondensate as that of Example 1:

| | Parts by wt. |
|---|---|
| Polycondensate solution | 45 |
| 65% oligoester solution of maleic anhydride and 2,2,4-trimethyl-1,3-pentanediol in styrene containing 100 p.p.m. of hydroquinone | 3 |
| Dicumyl peroxide | 0.75 |
| Magnesium stearate | 0.75 |
| Calcium carbonate | 25 |
| Clay | 24 |
| Calcined magnesia | 1.5 |

45 parts by weight of a glass fiber fabric of 50 cm. in width are then impregnated, then placed between two polyethylene films.

The obtained material, having a thickness of 8 mm., is placed between two electrodes of a high frequency field, having a spacing of 10 mm.

The apparatus is regulated to established a tension of 1400 volts/cm. between the electrodes, generating a temperature from about 90° to 95°. After a residence time of 30 seconds in the apparatus, the material is cooled. The polyethylene films can be easily separated from the material and the latter can be molded under pressure.

EXAMPLE 3

The same polycondensate as that of Example 1 is brought in solution in a mixture of equal parts of styrene and allyl phthalate in an amount of 63% by weight of polycondensate based on the solution.

A mixture is then prepared according to Example 2.

A strip of 30 cm. in width of a glass mat is continuously passed at room temperature between two rolls, and the mixture is poured thereon in an amount to provide a system composed of 65% by weight of composition and 35% by weight of mat. A polyethylene film is applied continuously on both faces of the pre-impregnated material which is afterwards passed for 3 minutes between two heating plates having a temperature of 80° C., then is cooled, rolled and finally stored. After six months, it was observed that the material had maintained the same homogeneity, that is could be easily handled and that it could be molded without difficulty.

EXAMPLE 4

A polycondensate is prepared from a mole of isophthalic acid, a mole of maleic anhydride and 2 moles of 1,2-propanediol.

The polycondensate is then taken in solution in styrene at a concentration of 60% by weight, based on the solution. 60 p.p.m. of hydroquinone are added to the solution.

The following impregnating composition is prepared:

| | Parts by wt. |
|---|---|
| Polycondensate solution | 40 |
| 65% oligoester solution of maleic anhydride and of neopentyl glycol in styrene containing 60 p.p.m. of hydroquinone | 10 |
| Calcined magnesia | 2 |
| Tertiary butyl perbenzoate | 1 |
| Calcium stearate | 1 |
| Calcium carbonate | 25 |
| Dolomite | 21 |

50 parts of chopped glass fibers are impregnated, then the mixture is heated for 5 minutes in a hot air oven maintained at 70° C. and afterwards cooled to a temperature close to 20° C.

After five months, the material whose aspect is practically unmodified, is molded without difficulty.

It will be understood that changes may be made in the details of formulation and operation without departing from the spirit of the invention, especially as defined in the following claims.

I claim:

1. Pre-impregnated materials comprising reinforcing fibers and an impregnating composition based on a co-polymerizable polyester resin and containing a metallic oxide or anhydride comprising (A) 10–70% by weight of reinforcing fibers and (B) 90–30% by weight of impregnating composition, said impregnating composition being formed of (1) a resin-oligoester solution mixture, (2) a polymerization initiator in an amount of 0.5 to 2% by weight of the solution mixture and (3) at least one oxide or hydroxide of a metal of Group II of the Periodic Table in an amount of 1 to 10% by weight based on the solution mixture, with the solution being formed of (a) 50 to 98% of a polyester resin containing 80 to 50% by weight of a polycondensate and 20 to 50% by weight of a vinyl crosslinking monomer, and (b) 50 to 20% by weight of a solution of 85 to 25% by weight of at least one oligoester having terminal maleic acid groups and 15 to 75% by weight of at least one cross linking monomer.

2. Pre-impregnated materials as claimed in claim 1 in which the metal oxide or hydroxide is present in an amount within the range of 2–5% by weight of the resin-oligoester solution mixture.

3. Pre-impregnated materials as claimed in claim 1 in which the reinforcing fibers are selected from the group consisting of natural fibers and artificial fibers and mixtures thereof.

4. Pre-impregnated materials as claimed in claim 3 in which the natural fibers are selected from the group consisting of flax, asbestos, sisal, hemp, jute and cotton.

5. Pre-impregnated materials as claimed in claim 3 in which the artificial fibers are selected from the group consisting of nylon (polyamide), glass, carbon, graphite and paper.

6. Pre-impregnated materials as claimed in claim 3 in which the fibrous component is present in the form of monofilaments, threads, mats or fabrics.

7. Pre-impregnated materials as claimed in claim 1 in which the oligoester solution having terminal maleic acid groups comprises a mixture of 85–25% by weight of at least one oligoester having terminal maleic acid groups and 15–75% by weight of at least one cross-linking vinyl monomer containing from 20 to 500 p.p.m. by weight of at least one polymerization inhibitor.

8. Pre-impregnated materials as claimed in claim 7 in which the oligoester having terminal maleic acid groups is selected from the group consisting of the acid maleate of 2,2,4-trimethyl-1,3-pentanediol, the acid maleate of neopentyl glycol, the acid maleate of trimethylolpropane and acid maleate of glycerol.

9. Pre-impregnated materials as claimed in claim 7 in which the cross-linking vinylic monomer in which the oligoester having terminal maleic acid groups is dissolved is the same as that used in the composition of the copolymerizable polyester resin.

10. Pre-impregnated materials as claimed in claim 1 in which the oxide or hydroxide of metals of Group II of the periodic classification of elements is selected from the group consisting of the oxides and hydroxides of calcium, magnesium and zinc.

11. Pre-impregnated materials as claimed in claim 1 in which the impregnating composition contains one or more additives selected from the group consisting of 0.1-2% by weight lubricant, 1-75% by weight filler, 0.5-5% by weight of modifiers, pigments, coloring agents and other additives.

12. Pre-impregnated materials as claimed in claim 11 in which the filler is present in an amount within the range of 40-60% by weight.

13. The process for the preparation of pre-impregnated materials of claim 1 in which the impregnating composition is formed by mixing 50-98% by weight of a copolymerizable polyester resin formed of 80 to 50% by weight of a polycondensate in 20 to 50% by weight of at least one cross linking vinyl monomer and 50 to 2% by weight of a solution of 85 to 25% by weight of at least one oligoester having terminal maleic acid groups in 15 to 75% by weight of at least one cross linking vinyl monomer to which 0.5 to 2% by weight based on the resin-oligoester solution mixture of at least one polymerization initiator, 1 to 10% by weight of the resin-oligoester solution mixture of at least one oxide or hydroxide of metals of Group II of the periodic classification of elements are added, impregnating the reinforcing fibers with the formed composition in an amount within the range of 90 to 30% by weight of the composition for 10 to 70% by weight of reinforcing fibers, heating the material to a temperature within the range of 50-100° C. for a time within the range of 20 seconds to 15 minutes.

14. The process as claimed in claim 13 in which the metal oxide or hydroxide is present in an amount within the range of 2-5% by weight.

15. The process as claimed in claim 13 in which the impregnating composition includes one or more of the materials selected from the group consisting of 0.1-2% by weight of a lubricant, 1-75% by weight of a filler, and from 0.5-5% by weight of modifiers, pigments, coloring agents and other additives.

16. The process as claimed in claim 15 in which the filler is present in an amount within the range of 40-60% by weight.

17. Molded articles produced by molding and polymerization of pre-impregnated materials defined in claim 1.

References Cited
UNITED STATES PATENTS

| | | | |
|---|---|---|---|
| 3,219,604 | 11/1965 | Fischer | 260—863 UX |
| 3,503,920 | 3/1970 | Takagi et al. | 260—40 |
| 3,523,143 | 8/1970 | Kwong | 260—40 X |
| 3,637,911 | 1/1972 | Baum et al. | 260—40 R X |

LEWIS T. JACOBS, Primary Examiner

U.S. Cl. X.R.

260—861, 863

UNITED STATES PATENT OFFICE
CERTIFICATE OF CORRECTION

Patent No. 3,766,129          Dated   October 16, 1973

Inventor(s)   Gaston Pesez

It is certified that error appears in the above-identified patent and that said Letters Patent are hereby corrected as shown below:

column 2, line 41, change "hydride" to "anhydride"

claim 1, line 15 (column 6, line 45), change "20%" to "2%"

Signed and sealed this 9th day of April 1974.

(SEAL)
Attest:

EDWARD M. FLETCHER, JR.
Attesting Officer

C. MARSHALL DANN
Commissioner of Patents